C. D. HARNESS AND C. D. BRADSHAW.
CORN PLANTER.
APPLICATION FILED AUG. 30, 1920.
1,420,923.
Patented June 27, 1922.
2 SHEETS—SHEET 2.
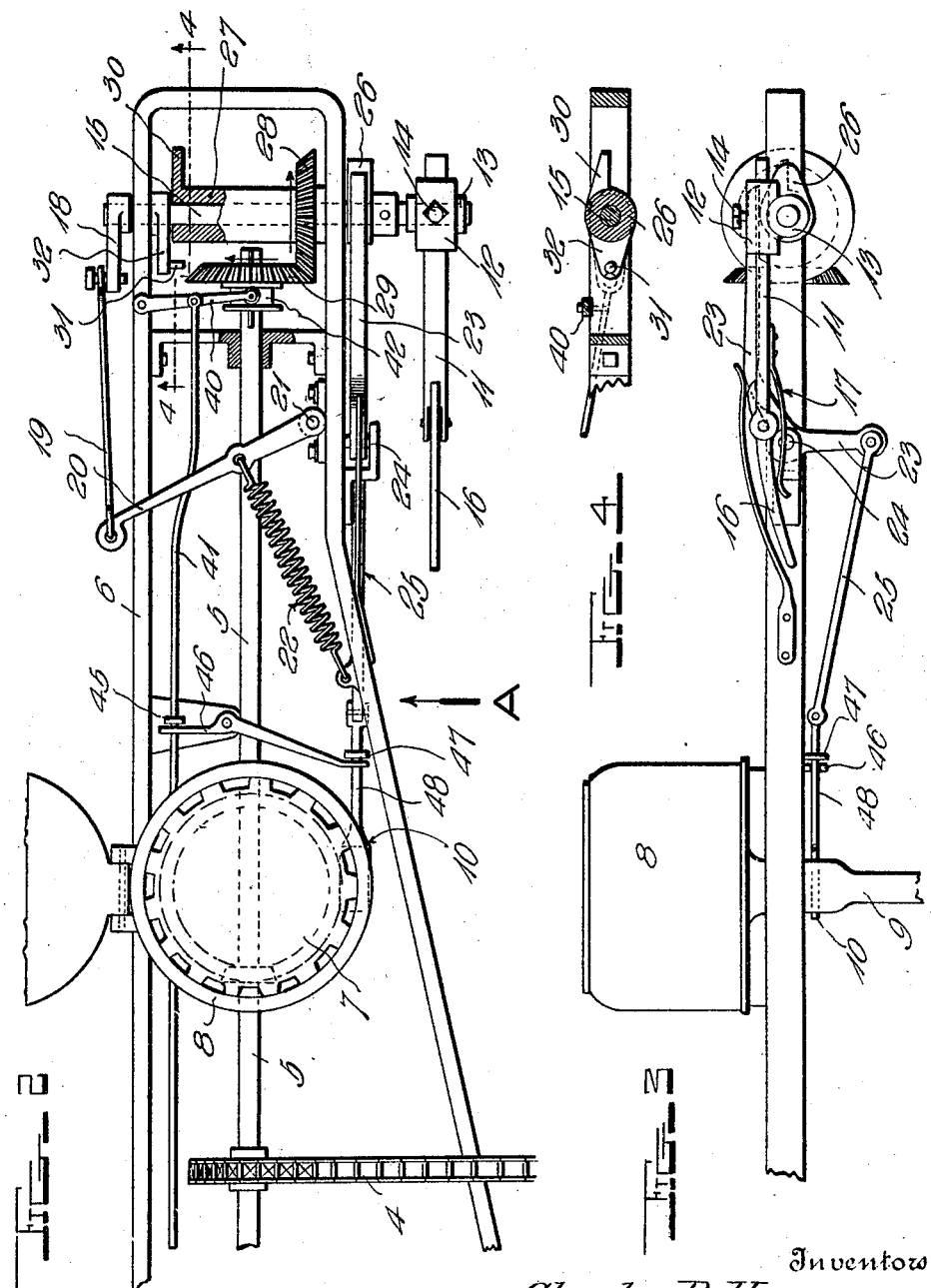
Inventors
Charles D. Harness
Charles D. Bradshaw
Witness

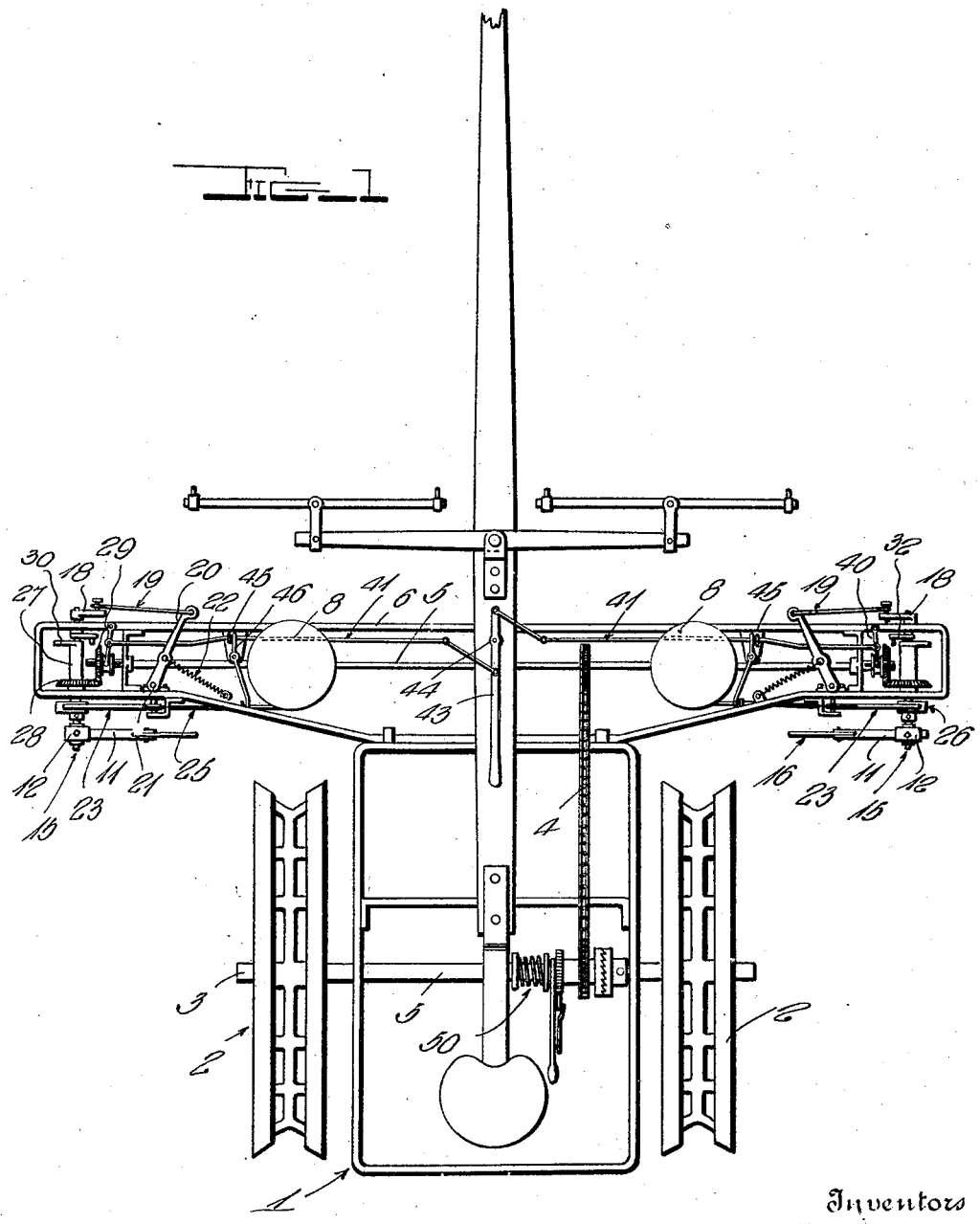

UNITED STATES PATENT OFFICE.

CHARLES D. HARNESS, OF XENIA, AND CHARLES D. BRADSHAW, OF LUCASVILLE, OHIO.

CORN PLANTER.

1,420,923. Specification of Letters Patent. Patented June 27, 1922.

Application filed August 30, 1920. Serial No. 406,752.

*To all whom it may concern:*

Be it known that we, (1) CHARLES D. HARNESS and (2) CHARLES D. BRADSHAW, citizens of United States of America, residing at (1) Xenia, (2) Lucasville, in the county of (1) Green, (2) Scioto, and State of Ohio, have invented certain new and useful Improvements in Corn Planters; and we do declare the following to be a full, clear, and exact description of the invention, such as will enable others skilled in the art to which it appertains to make and use the same.

Our invention relates to improvements in corn planters, and more particularly to those of the type designed in such a manner that the use of a check wire is unnecessary to properly align the hills of corn in both directions across the field.

The principal object of the invention is to provide an extremely simple and comparatively inexpensive, yet a highly efficient and reliable arrangement of parts for operating pivoted markers in properly timed relation with the corn dropping means of the machine, the marks made by the markers, serving as guides for all but the first trip across the field, whereby if on each return trip, one marker is made to engage the marks made on the preceding trip, the rows will be aligned transversely of the field as well as longitudinally thereof.

In carrying out the above end, in order to rapidly form each mark and thus prevent elongation thereof in the direction of travel, spring means are provided for quickly operating each of the markers after it has been moved to a predetermined position, by power, and a further object of the invention is to provide a novel arrangement of parts for turning the markers to the proper points to permit the spring means to act simultaneously with the dropping of the seed.

In the preferred form of construction, a valve which controls the discharge of corn from the usual seed hopper, is operated from a shaft which intermittently sets the marker in position to be actuated by the spring means above referred to, and a further object of the invention is to provide a unique arrangement of parts for simultaneously discontinuing the rotation of said shaft and for holding said valve in open position, whereby the machine may be used for drilling instead of checking the corn.

With the foregoing and minor objects in view, the invention resides in the novel construction and combination of parts hereinafter fully described and claimed, the descriptive matter being supplemented by the accompanying drawings.

Figure 1 is a top plan view of a corn planter constructed in accordance with our invention;

Figure 2 is an enlarged plan view of one end of the hopper frame and the marking mechanism carried thereby;

Figure 3 is a rear edge view of the hopper frame as indicated by the arrow A of Figure 2;

Figure 4 is a detail vertical section as designated by line 4—4 of Figure 2.

In the drawings above briefly described, the numeral 1 designates a conventional form of corn planter frame which is supported on suitable wheels 2 and an axle 3, said axle being driven by said wheels and serving, through the instrumentality of a chain or the like 4, to drive a transverse shaft 5 on the hopper frame 6, said shaft having means for driving the usual feed discs 7 within the seed hoppers 8. The usual shoes 9 are employed for splitting the earth and guiding the seed thereinto, and slide valves 10 or valves of any other preferred form, are employed for releasing the seed and permitting it to drop into said shoes, only when said valves are opened. These valves are operated by a novel arrangement of parts as described below and each time the valves are opened to drop the seed, marking arms 11 are actuated to make a mark in the earth at a point substantially opposite the hill, at a point spaced outwardly from the hopper a distance equal to half the distance between the two shoes 9. The marking arms 11 are shown passing slidably and rotatably through bearings 12 which are provided with hubs 13, said arms being secured against movement in said bearings by set screws 14, while the hubs are keyed or otherwise suitably secured on a pair of short longitudinal shafts 15 which are carried by the outer ends of the hopper frame 6. It will be understood that the marking arms 11 could be attached to the shafts 15 in any other adequate manner, but the general arrangement shown is preferred in order that any necessary adjustments may be made. Furthermore, although we have shown a pair of yielding terminals 16 on the arms 11 and springs 17 for holding them in substantial alignment with said arms for marking the earth, it will be understood that this feature need not in all instances be followed. It is desirable however, in order to prevent possible injury to the machine in case the marker should strike a stone or other obstruction.

As shown, the shafts 15 extend both forwardly and rearwardly to a slight extent from the hopper frame 6 and the marking arms 11 are carried by the rear ends of said shafts. The front ends of the shafts in question are provided with crank arms 18 to which links 19 are connected, said links leading to a pair of pivoted horizontally swinging arms 20 which are mounted at 21 on and operate preferably above the hopper frame 6. Coiled springs 22 or other preferred spring means, are attached at one end to the arms 20 and are anchored at the other ends to the frame 6, whereby to exert a constant inward stress on said arms, thereby holding the crank arms 18 in the position shown in Figure 2, with the result that the marking arms 11 are held out of engagement with the ground. By the novel means described below however, the shafts 15 and arms 11 may be turned throughout slightly more than a half revolution by power, thereby causing the parts 18, 19 and 20 to place the springs 22 under maximum tension, which tension then acts to rapidly turn the shafts 15 in advance of the power means previously turning them whereby to quickly mark the earth at points opposite the hills of corn as the latter are dropped.

Numerous mechanisms might be employed for synchronizing the movement of the valves 10 and the marking arms 11, but we prefer to employ the construction shown most clearly in Figures 2 and 3. Bell cranks 23 are fulcrumed at 24 to the rear side of the hopper frame 6 at points spaced inwardly from the shafts 15, one arm of said bell cranks being connected with the valves 10 by pivoted links or the like 25, while the other ends of said cranks overlie cams 26 carried by the shafts 15. It will thus be seen that these shafts control the valves 10 as well as the marking arms 11 and it is thus insured that said valves and arms shall operate in proper relation.

For turning the shafts 15 by power, we have shown short tubular shafts 27 mounted rotatably on said shafts 15, and driven from the shaft 5, by means of beveled gears 28 and 29. The front end of each shaft 27 carries a lateral arm 30 adapted to contact with an off-center part carried by the adjacent shaft 15, these parts being here shown in the form of pins 31 extending laterally from arms 32 which are carried rigidly by the shafts 15. The shafts 27 are constantly driven from the shaft 5 and when their arms 30 strike the pins 31 the shafts 15 are turned by power throughout a trifle more than 180 degrees. When this point is reached however the arms 18 have passed dead center with the result that the springs 22 act upon the arms 20, the links 19, and said arms 18 to rapidly rotate the shafts 15 throughout the remainder of the revolution. During this movement, the arms 30 travel away from the pins 31 and it will be seen that the cams 26 operate the bell cranks 23 to open the valves 10 and drop the corn, while the marking arms 11 simultaneously mark the earth.

In order that the planter may be used for drilling the corn instead of checking the same, whenever desired, we provide a novel arrangement of parts for discontinuing the drive of the shafts 27 and for simultaneously holding the valves 10 in open position. In the present embodiment of the invention, the gears 29 are slidably mounted on the shaft 5 in order that they may be withdrawn from engagement with the gears 28, and we have shown pivoted arms 40 and rods 41 for so shifting said gears. The arms 40 are pivoted to the hopper frame 6 at one end and have a suitable running connection 42 with the gears 29, the outer ends of the rods 41 are connected to said rods 40, and the inner ends of said rods may be attached to any suitable operating means. For illustrative purposes however, we have shown said rods pivoted to a hand lever 43 on opposite sides of the fulcrum 44 of said lever. By this arrangement, when the lever is operated, the rods 41 are moved oppositely to either engage the gears 29 with the gears 28 or to disengage said gears. The rods 41 are provided with stops 45 cooperable with the front ends of levers 46 for rocking these levers around their fulcrums when the rods are pulled inwardly to throw the marking mechanism out of gear. The rear ends of the levers 46 are operatively related with stops 47 on the shanks 48 of the valves 10, in such manner that when said levers are moved by inward movement of the rods 41, said shanks 48 are pulled outwardly, with the result that the valves 10 are opened and held in open position. The planter may then be used for drilling the corn and the marking mechanism is then thrown out of operation, due to disengagement of the gears 28 and 29.

When the machine is drawn over the field and the gears 28 and 29 are interengaged, the hills of corn are checked and at the same time the earth is marked opposite said hills. Thus, on the return trip, by always causing one of the markers to strike in the marks made by said marker during the previous trip, the rows of corn will be properly aligned transversely of the field as well as longitudinally thereof. At the same time, another row of marks is made to be followed on the next trip across the field. In order to properly set the marking mechanism at the beginning of each trip or in case this should otherwise be necessary, any appropriate lever operated ratchet mechanism such as that indicated at 50 in Figure 1, may be used.

By constructing the machine in or substantially in the manner shown and described, it will be highly efficient and reliable and will serve to properly check the rows of corn in both directions, even though no check wire is used, as in most machines now on the market. This is greatly advantageous not only in saving time, but in convenience and by saving the expense of check wires.

Since probably the best results may be obtained from the details disclosed, such details may be followed if desired, but we wish it understood that within the scope of the invention as claimed, numerous changes may well be made.

We claim:—

1. The combination with a portable frame, of a shaft mounted on said frame and rotatable in one direction only, a marking arm carried by said shaft, means for turning said shaft by power throughout a portion of a revolution, and spring means for then immediately acting on said shaft and rapidly completing the revolution thereof to quickly operate said marking arm.

2. The combination with a portable frame, of a shaft extending longitudinally of and mounted rotatably on said frame, a marking arm extending laterally from said shaft, spring means connected to said shaft for rapidly increasing the speed of the latter the moment it has been rotated to a predetermined point by power, an off-center part carried by said shaft, a tubular shaft rotatable upon the aforesaid shaft and having a lateral extension adapted to strike said off-center part and turn said first named shaft to the aforesaid predetermined point, and means for continuously driving said tubular shaft.

3. The combination with a portable frame, of a shaft extending longitudinally of and rotatably mounted on said frame, a marking arm on said shaft, a crank arm on one end of said shaft, a link connected to said crank arm, a horizontally swinging arm attached at one end to said link and pivoted to the frame, a spring acting on said horizontally swinging arm, whereby to quickly increase the speed of said shaft when the latter is rotated to a predetermined point, and means for turning said shaft to said predetermined point.

4. The combination with a portable frame, of a short shaft extending longitudinally of and rotatably mounted on said frame, a marking arm on said shaft, a crank arm on one end of said shaft, a link connected to said crank arm, a horizontally swinging arm attached at one end to said link and pivoted to the frame, a spring acting on said horizontally swinging arm to quickly increase the speed of said shaft when the latter is rotated to a predetermined point, an off-center part carried by said shaft, a tubular shaft mounted on the first named shaft and having a lateral arm adapted to strike said off-center part to rotate said first named shaft to a predetermined point, and means for continuously driving said tubular shaft.

5. The combination with a portable frame, of a marker-carrying shaft mounted rotatably on one end of said frame and extending parallel with the line of travel, means for intermittently rotating said shaft to actuate its marker, feeding means on said frame spaced inwardly from said shaft and including a valve for controlling the discharge of seed, and means extending inwardly from said marker-carrying shaft for operating said valve.

6. The combination with a portable frame, of a marker-carrying shaft rotatably mounted on one end of said frame and disposed parallel with the line of travel, means for intermittently driving said shaft to operate its marker, a cam on said marker-carrying shaft, a bell crank operated by said cam and fulcrumed on the frame for operation in a vertical plane at right angles to the line of travel, feeding means on said frame spaced inwardly from said shaft and including a valve for controlling the discharge of seed, and a link connecting said bell crank with said valve.

7. The combination with a planter having a valve for controlling the discharge of seed, of means carried by the planter for marking the earth opposite the hills of seed, means for operating said marking means and said valve, including a longitudinally movable rod, a manually slidable control rod parallel with the aforesaid rod for throwing the marking mechanism out of play, and means operated by said controlling rod for moving said first named rod to hold the valve open while the marking mechanism is thrown out of play, allowing the machine to be used for drilling.

In testimony whereof we have hereunto set our hands.

CHARLES D. HARNESS.
CHARLES D. BRADSHAW.